US007195096B1

(12) United States Patent
Mawhinney

(10) Patent No.: US 7,195,096 B1
(45) Date of Patent: Mar. 27, 2007

(54) PEDAL PUSHER

(76) Inventor: Bruce A Mawhinney, 328 Winnebago Trail, Fort Myers Beach, FL (US) 33931

( * ) Notice: Subject to any disclaimer, the term of this patent is extended or adjusted under 35 U.S.C. 154(b) by 0 days.

(21) Appl. No.: 11/391,075

(22) Filed: Mar. 28, 2006

Related U.S. Application Data

(63) Continuation-in-part of application No. 10/836,685, filed on Apr. 30, 2004, now Pat. No. 7,040,447.

(51) Int. Cl.
*B60K 26/00* (2006.01)

(52) U.S. Cl. .................... 180/315; 74/473.16; 74/478; 74/481

(58) Field of Classification Search ................ 180/315, 180/333, 336; 74/473.1, 473.16, 473.17, 74/478, 481, 482
See application file for complete search history.

(56) References Cited

U.S. PATENT DOCUMENTS 2,953,036 A * 9/1960 Wendt ...................... 74/484 R
4,324,309 A * 4/1982 Ginley ...................... 180/316
4,436,191 A * 3/1984 Perry ...................... 477/209
4,438,835 A * 3/1984 Dowden et al. ........... 477/193
5,022,477 A * 6/1991 Wanie ...................... 180/6.34
5,025,905 A * 6/1991 Lenz ...................... 477/209
5,129,492 A * 7/1992 Lenz et al. .................. 477/27
5,542,312 A * 8/1996 Peters ...................... 74/481
5,553,992 A * 9/1996 Ashcroft ..................... 414/685
6,131,712 A * 10/2000 Rhodenizer ................. 188/352
6,279,937 B1 * 8/2001 Hunt ...................... 180/336

* cited by examiner

*Primary Examiner*—D. Glenn Dayoan
*Assistant Examiner*—Toan C. To

(57) ABSTRACT

A pedal pusher to provide for single handed manipulation of two (2) pedals of a motor vehicle, such as a golf cart, is disclosed. A first manipulation of the device in an arc range of motion controls a first pedal of the vehicle while a second manipulation of the device in a rotational range of motion controls a second pedal of the vehicle. Angular adjustment of the device to a desired orientation relative to the seat of the vehicle for the comfort of the operator is provided for.

16 Claims, 3 Drawing Sheets

FIG. 3
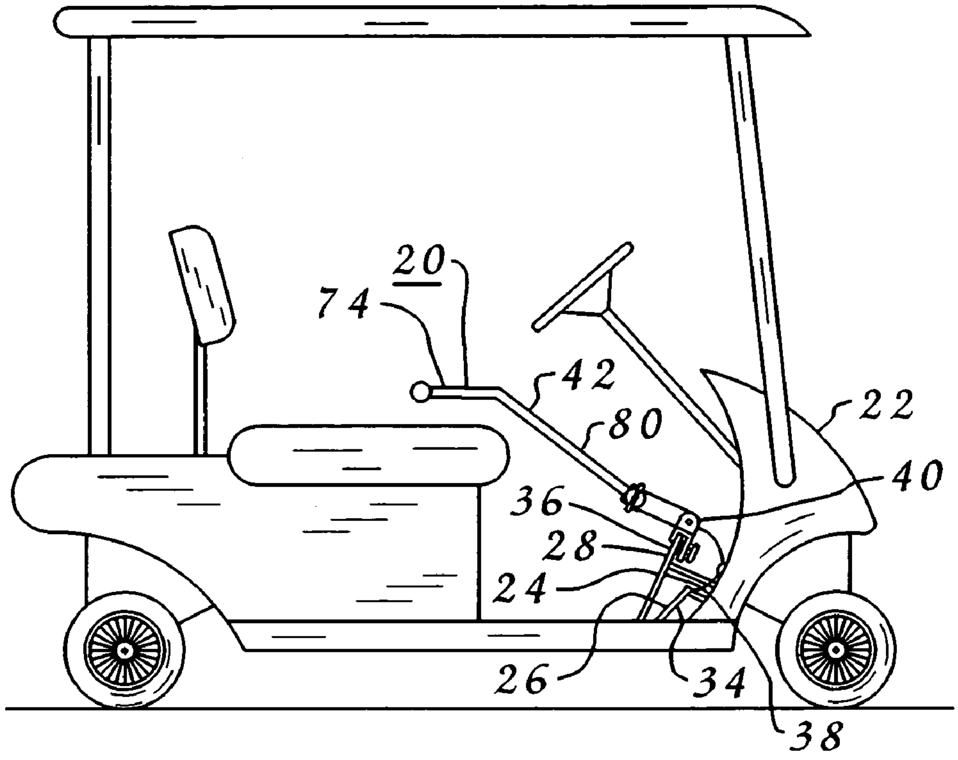
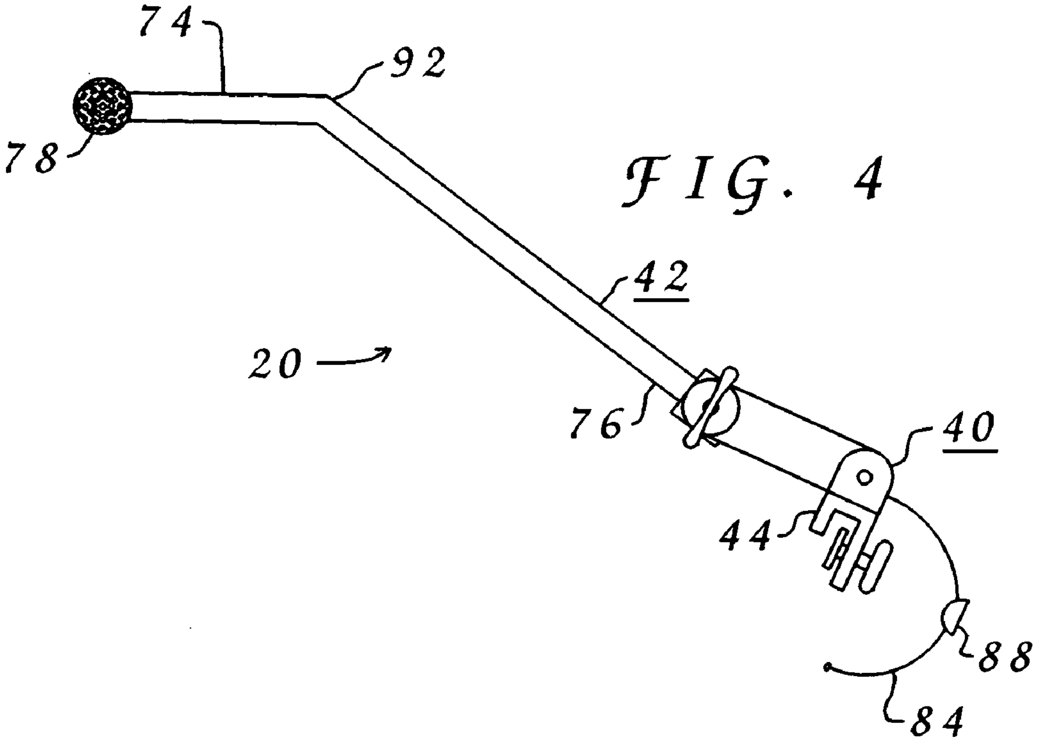
FIG. 4

PEDAL PUSHER

CROSS-REFERENCE

This application is a continuation-in-part of Ser. No.: 10/836,685 filed Apr. 30, 2004, now U.S. Pat. No. 7,040,447 entitled "Pedal Pusher", currently pending. The original application is incorporated herein by this reference.

BACKGROUND

1. Field of the Invention

Generally, the invention relates to pedal manipulation devices for motorized vehicles. More specifically, the invention relates to such devices which are hand operated and which operate two (2) pedals of the motorized vehicle.

2. Description of the Prior Art

Various devices are known in the art to provide persons having limited dexterity with the ability to operate motor vehicles. These include devices which provide the operator of the motor vehicle with the ability to manipulate operation of an accelerator pedal of the vehicle utilizing their hands. Typically these devices are complicated and operate directly upon the mechanisms of the vehicle controlled by the pedal and not upon the pedal proper.

Golf carts and other motorized vehicles which are intended to be used in non highway situations are often used to move about at low speeds such as on or about golf courses or in generally closed residential communities such as mobile home parks and gated communities. Many persons who would benefit from use of such motorized vehicles are unable to enjoy such use due to limited dexterity or other physical disabilities.

As such, it may be appreciated that there continues to be a need for a simple device which will allow the user of motorized vehicles to operate two (2) foot pedals using their hand while not limiting conventional usage of the motorized vehicle by other operators. The present invention substantially fulfills these needs.

SUMMARY

In view of the foregoing disadvantages inherent in the known methods for controlling operation of pedals of a motor vehicle your applicant has devised a hand operated control device to provide for control of two (2) pedals mounted relative to a floor of the motor vehicle. Applicable motor vehicles have a seat positioned relative to the pedals for an operator of the motor vehicle. Each pedal of the vehicle has an elevated neutral position and a depressed operating position. The hand operated control device has a connection portion and an extension portion. The connection portion attaches to a first pedal of the motor vehicle which a portion attached to the second pedal of the motor vehicle. The extension portion has a user manipulation end and a distal end with the distal end positioned relative to the connection portion attached to the pedal. The user manipulation end has a user contact portion to provide for operator control of the extension portion in a range of motion along an arc. The range of motion has a lower position and an upper position. The lower position of the range of motion provides for placement of the pedal of the motor vehicle in the elevated neutral position. The upper position of the range of motion provides for placement of the pedal of the motor vehicle at least toward the depressed operating position from the elevated neutral position. The angular adjustment means provides for selective placement of the extension portion relative to the connection portion at a desired angle of protrusion where the extension portion may be positioned at a user selected desired orientation relative to the seat of the motor vehicle. The user manipulation end provides for operator control of the extension portion in a range of motion along an arc. This range of motion has a lower position and an upper position. The lower position of this range of motion provides for placement of the first pedal of the motor vehicle in the elevated neutral position. The upper position of this range of motion provides for placement of the first pedal of the motor vehicle at least toward the depressed operating position from the elevated neutral position. The user manipulation end also provides for operator control of the user contact portion in a rotational range of motion. The rotational range of motion has a neutral position. The neutral position of the rotational range of motion provides for placement of the second pedal of the motor vehicle in the elevated neutral position. Rotation of the user contact portion from the neutral position provides for placement of the second pedal of the motor vehicle at least toward the depressed operating position from the elevated neutral position.

My invention resides not in any one of these features per se, but rather in the particular combinations of them herein disclosed and it is distinguished from the prior art in these particular combinations of these structures for the functions specified.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto. Those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

It is therefore a primary object of the present invention to provide for a hand operated control device which will permit hand manipulation of two (2) foot pedals of a vehicle where persons having physical limitations may enjoy the use of their vehicles.

Other objects include:

a) to provide for a hand operated control device for control of a first pedal of the vehicle by manipulating a user manipulation end of the device in a range of motion in an arc.

b) to provide for a hand operated control device for control of a second pedal of the vehicle by manipulating a user manipulation end of the device in a rotational range of motion.

c) to provide for a hand operated control device having adjustment capabilities to permit ready adjustment of an angle of extension from the pedal of the vehicle for comfortable usage.

d) to provide for a user contact portion of the extension portion of the hand operated control device to have a spherical shape and dimples positioned thereon where the user contact portion resembles a golf ball.

e) to provide for a hand operated control device which safely returns the first pedal to an elevated neutral position when the hand operated control device is not manipulated by the operator.

f) to provide for a hand operated control device which safely returns the second pedal to an elevated neutral position when the hand operated control device is not manipulated by the operator.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated the preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein;

FIG. 3 is an elevational view of the golf cart and hand operated control device shown in FIG. 1 with the hand operated control device in a third operational orientation.

FIG. 4 is an enlarged elevational view of the hand operated control device shown in FIG. 1.

DESCRIPTION

Figure 1:
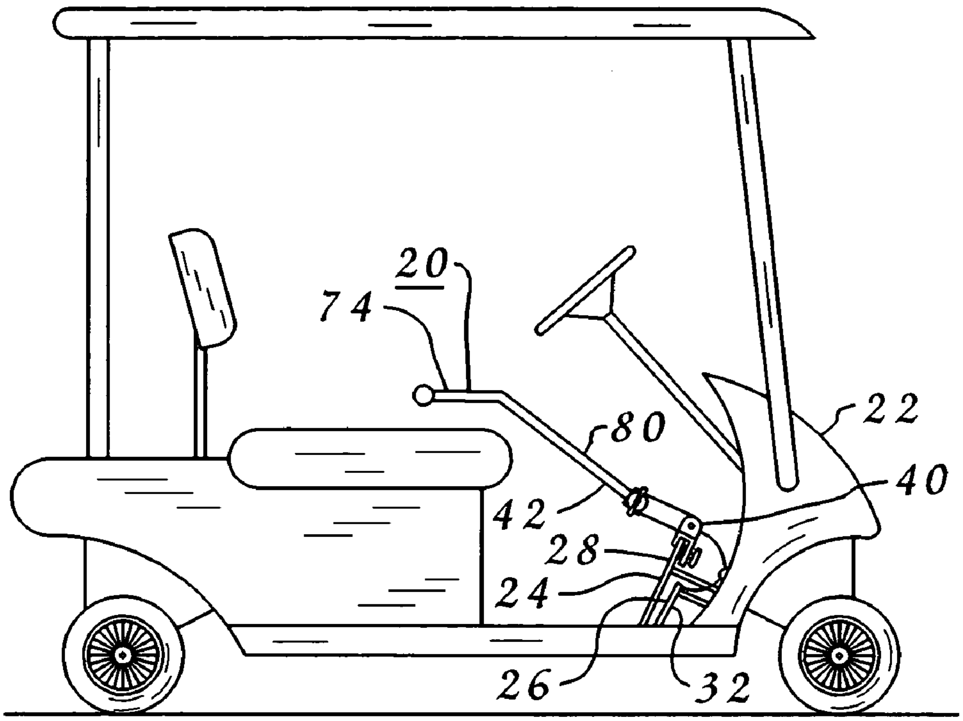
FIG. 1 is an elevational view of a golf cart with a hand operated control device positioned thereon and in a first operational orientation.

Many different pedal pushers, or hand operated control devices, having features of the present invention are possible. The following description describes the preferred embodiment of select features of those hand operated control devices and various combinations thereof. These features may be deployed in various combinations to arrive at various desired working configurations of hand operated control devices.

Reference is hereafter made to the drawings where like reference numerals refer to like parts throughout the various views.

Figure 2:
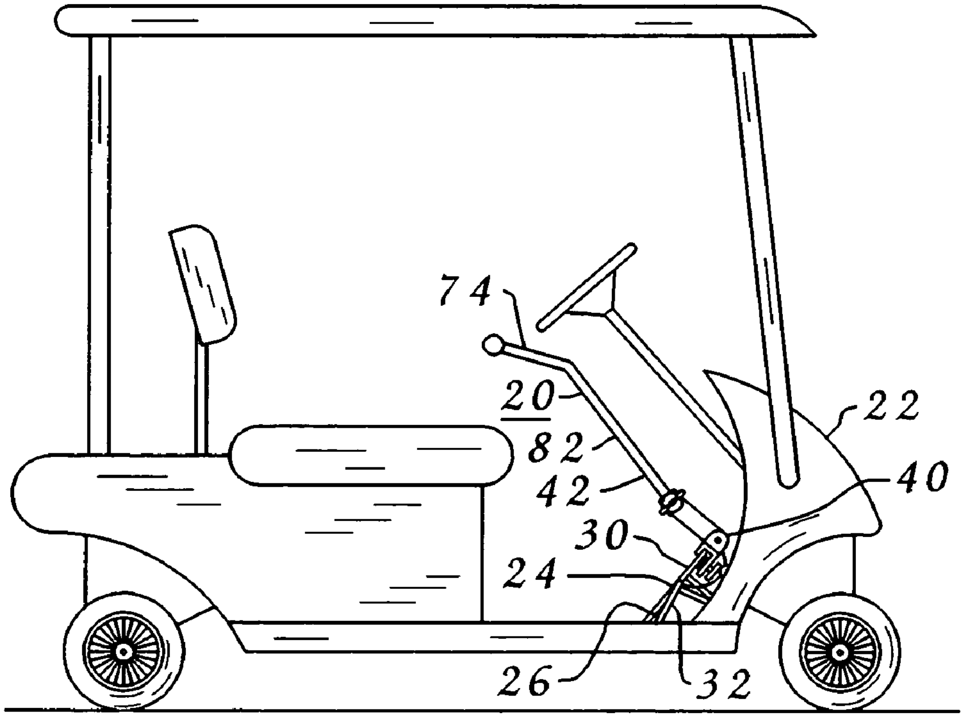
FIG. 2 is an elevational view of the golf cart and hand operated control device shown in FIG. 1 with the hand operated control device in a second operational orientation.

A hand operated control device 20, a pedal pusher, is depicted in the various views. FIG. 1 through FIG. 3 depict hand operated control device 20 positioned on a motor vehicle 22, in the form of a golf cart. A first pedal 24 and a second pedal 26 are mounted relative to a floor of motor vehicle 22 where an operator, not shown in any of the various views, of motor vehicle may manipulate first pedal 24 and second pedal 26 while resting on a seat of motor vehicle 22. Preferably first pedal 24 is a brake pedal and second pedal 26 is an accelerator pedal.

FIG. 1 depicts first pedal 24 of motor vehicle 22 in an elevated neutral position 28 while FIG. 2 depicts first pedal 24 in a depressed operating position 30 following a manipulation of hand operated control device 20. FIG. 1 also depicts second pedal 26 of motor vehicle 22 in an elevated neutral position 32 while FIG. 3 depicts second pedal 26 in a depressed operating position 34 following a manipulation of hand operated control device 20. First pedal 24 has an upper user contact surface 36 and a backing surface 38 opposing upper user contact surface 36.

Hand operated control device 20 has a connection portion 40 and an extension portion 42. It is a requirement that hand operated control device 20 be attached to first pedal 24. Many structural arrangements may be employed to provide this function. Connection portion 40 is formed of a pedal bracket 44, see FIG. 5, capable of being positioned on pedals having a variety of thicknesses. Pedal bracket 44 has a pedal slot 46 into which first pedal 24 is positioned. An upper contact portion 48 engages a small portion of upper user contact surface 36 of first pedal 24. If desired various structural configurations may be employed on upper contact portion 48 to enhance retention properties relative to upper user contact surface 36. A lower contact portion 50, in the form of tightening pads 52, engage backing surface 38 of first pedal 24. Securing means, in the form of tightening knobs 54, having threads thereon penetrate threaded apertures 56 of pedal bracket 44. Tightening knobs 54 provide for an application of a binding pressure between upper contact portion 48 and lower contact portion 50 to bind connection portion 40 to first pedal 24 of motor vehicle 22.

Pedal bracket 44 has opposing spaced engagement tabs 58 having a passage 60 therebetween. Each engagement tab 58 has an aperture 62 therethrough to receive a shaft 64 of a locking member 66. Locking member 66 has locking means, as conventionally known in the art, to retain locking member 66 within apertures 62.

Passage 60 receives an extension bar 68 having an aperture 70 therethrough. When extension bar 68 is positioned in passage 60 and locking member 66 is installed extension bar 68 is securely retained relative to pedal bracket 44, a part of connection portion 40. Extension bar 68 has an opposing aperture 72 positioned thereon.

Extension portion 42 has a user manipulation end 74 and a distal end 76. Distal end 76 is positioned relative to connection portion 40. Manipulation of user manipulation end 74 of extension portion 42 in an arc provides for transfer of first pedal 24 between elevated neutral position 28 and depressed operating position 30. User manipulation end 74 has a user contact portion 78 to provide for operator control of extension portion 42 in a range of motion along the arc. The range of motion has a lower position 80, see FIG. 1, and an upper position 82, see FIG. 2. In the preferred embodiment depicted user contact portion 78 of extension portion 42 has a spherical shape and dimples positioned thereon where user contact portion 78 resembles a golf ball. In a most preferred embodiment an actual golf ball is used to form user contact portion 78.

Figure 6:
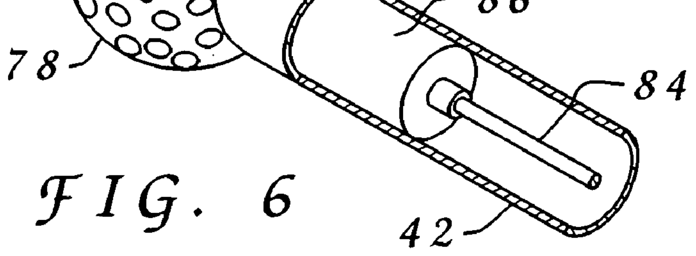
FIG. 6 is an enlarged exploded perspective view of a portion of the hand operated control device.

Manipulation of user manipulation end 74 of extension portion 42 in a rotational manner provides for transfer of second pedal 26 between elevated neutral position 32 and depressed operating position 34. During rotation of user contact portion 78 a cable 84 is moved toward user manipulation end 74 and is moved away from user manipulation end 74. FIG. 6 depicts a retraction assembly 86, as conventionally known in the art, capable of such transfer. When user contact portion 78 is released by the operator cable 84 returns to an extended orientation. Cable 84 passes through extension portion 42 and passes through a guide 88 and is anchored to second pedal 26. Guide 88 is secured to the floor of motor vehicle 22 utilizing a nut 90. When structural modification to the motor vehicle, such as forming an aperture through the floor, it is possible to anchor guide 88 to existing structures without any structural modification.

Preferably extension portion 42 will have an angular offset 92 positioned between user manipulation end 74 and distal end 76 where extension portion 42 extends relative to first pedal 24 in a first directional orientation 94 and then extends toward user manipulation end 74 in a second directional orientation 96, see FIG. 1. This arrangement provides for comfortable usage of hand operated control device 20.

It is a desire to provide angular adjustment means to provide for selective placement of the extension portion relative to the connection portion at a desired angle of protrusion wherein the extension portion may be positioned at a desired orientation relative to the seat of the motor vehicle. Many structural arrangements may be employed to provide this function.

Figure 5:
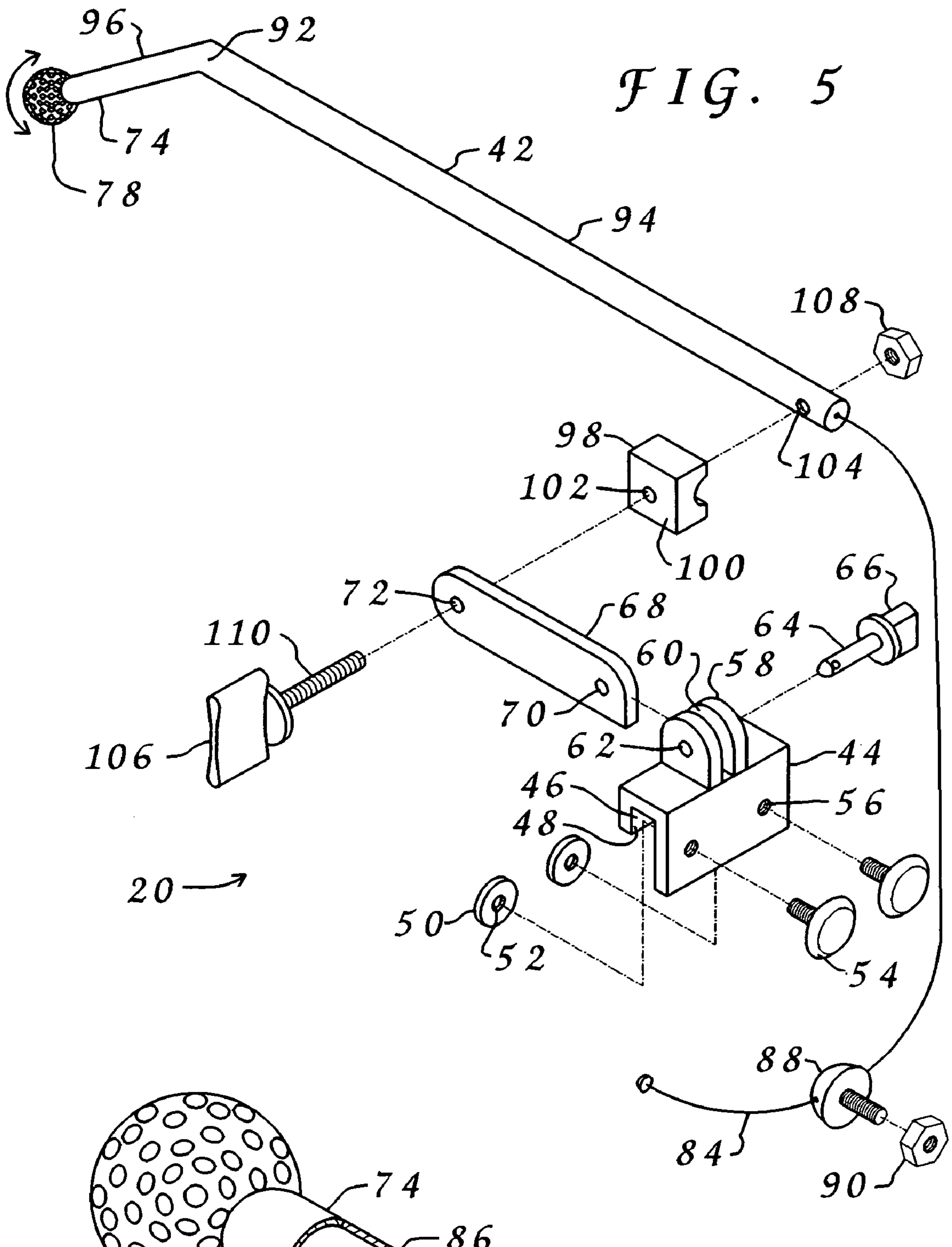
FIG. 5 is an exploded perspective view of the hand operated control device.

FIG. 5 depicts extension bar 68 having opposing aperture 72 therethrough. A contact bracket 98 has a contact surface 100 thereon having a texture thereto. Contact bracket 98 has an aperture 102 therethrough. A bracket contact surface, not shown, of extension bar 68 has a texture thereon which contacts contact surface 100 of contact bracket 98. Contact bracket 98 contacts, in a non-rotational manner, extension bar 68. Extension portion 42 has apertures 104 therethrough. A coupling member, in the form of a wing nut 106 and a nut 108 cooperate to provide a binding pressure to retain extension portion 42 in a desired orientation relative to connection portion 40. Wing nut 106 having a shaft portion 110 passes through opposing aperture 72 of extension bar 68 and through aperture 102 of contact bracket 98 and through apertures 104 of extension bar 68 and is secured therein by nut 108. The binding pressure produced by the coupling member acts upon the textured surfaces in contact to prevent rotation about the axis formed by wing nut 106.

With respect to the above description then, it is to be realized that the optimum dimensional relationships for the parts of the invention, to include variations in size, material, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A hand operated control device to provide for control of a first pedal mounted relative to a floor of a motor vehicle and a second pedal mounted relative to the floor of the motor vehicle, the first pedal of the motor vehicle further comprises an upper user contact surface and a backing surface opposing the upper user contact surface, the motor vehicle having a seat positioned relative to the first pedal and the second pedal for an operator of the motor vehicle, the first pedal having an elevated neutral position and a depressed operating position, the second pedal having an elevated neutral position and a depressed operating position, the hand operated control device comprising:

a) a connection portion for attachment to the first pedal of the motor vehicle, the connection portion comprising:

1) an upper contact portion to engage a small portion of the upper user contact surface of the first pedal;

2) a lower contact portion to engage the backing surface of the first pedal;

3) securing means to provide for applying a binding pressure between the upper contact portion and the lower contact portion to bind the connection portion to the first pedal of the motor vehicle;

b) a coupling portion extending from the connection portion to the second pedal of the motor vehicle;

c) an extension portion having a user manipulation end and a distal end, the distal end positioned relative to the connection portion, the user manipulation end having a user contact portion, the user manipulation end to provide for:

1) operator control of the extension portion for manipulation of the first pedal of the motor vehicle from the elevated neutral position toward the depressed operating position;

2) operator control of the user contact portion for manipulation of the second pedal of the motor vehicle from the elevated neutral position toward the depressed operating position.

2. The hand operated control device defined in claim 1 wherein the operator control of the extension portion for manipulation of the first pedal of the motor vehicle further comprises manipulation in a range of motion in an arc.

3. The hand operated control device defined in claim 1 wherein operator control of the user contact portion for manipulation of the second pedal of the motor vehicle further comprises manipulation in a rotational range of motion.

4. The hand operated control device defined in claim 1 further comprising angular adjustment means to provide for selective placement of the extension portion relative to the connection portion at a desired angle of protrusion wherein the extension portion may be positioned at a desired orientation relative to the seat of the motor vehicle.

5. The hand operated control device defined in claim 4 wherein the angular adjustment means further comprises:

a) a first textured surface positioned relative to the extension portion, the first textured surface having an aperture therethrough;

b) a second textured surface positioned relative to the extension portion, the second textured surface having an aperture therethrough;

c) a coupling member having a shaft portion and a locking portion wherein the shaft portion extends through the aperture of the first textured surface and the aperture of the second textured surface with the first textured surface facing the second textured surface and wherein the locking portion cooperates with the shaft portion to provide a binding pressure to retain the extension portion in the desired orientation.

6. A hand operated control device to provide for control of a first pedal mounted relative to a floor of a motor vehicle and a second pedal mounted relative to the floor of the motor vehicle, the motor vehicle having a seat positioned relative to the first pedal and the second pedal for an operator of the motor vehicle, the first pedal having an elevated neutral position and a depressed operating position, the second pedal having an elevated neutral position and a depressed operating position, the hand operated control device comprising:

a) a connection portion for attachment to the first pedal of the motor vehicle;

b) an extension portion having a user manipulation end and a distal end, the distal end positioned relative to the connection portion, the user manipulation end having a user contact portion, the user manipulation end to provide for:

1) operator control of the extension portion in a range of motion along an arc, the range of motion having a lower position and an upper position, and wherein the lower position of the range of motion provides for placement of the first pedal of the motor vehicle in the elevated neutral position and wherein the upper position of the range of motion provides for placement of the first pedal of the motor vehicle at least toward the depressed operating position from the elevated neutral position;

2) operator control of the user contact portion in a rotational range of motion, the rotational range of motion having a neutral position, and wherein the neutral position of the rotational range of motion provides for placement of the second pedal of the motor vehicle in the elevated neutral position and wherein rotation of the user contact portion from the neutral position provides for placement of the second pedal of the motor vehicle at least toward the depressed operating position from the elevated neutral position.

7. The hand operated control device defined in claim 6 further comprising angular adjustment means to provide for selective placement of the extension portion relative to the connection portion at a desired angle of protrusion wherein the extension portion may be positioned at a desired orientation relative to the seat of the motor vehicle.

8. The hand operated control device defined in claim 7 wherein the angular adjustment means further comprises:

a) a first textured surface positioned relative to the extension portion, the first textured surface having an aperture therethrough;

b) a second textured surface positioned relative to the extension portion, the second textured surface having an aperture therethrough;

c) a coupling member having a shaft portion and a locking portion wherein the shaft portion extends through the aperture of the first textured surface and the aperture of the second textured surface with the first textured surface facing the second textured surface and wherein the locking portion cooperates with the shaft portion to provide a binding pressure to retain the extension portion in the desired orientation.

9. The hand operated control device defined in claim 6 wherein the first pedal of the motor vehicle further comprises an upper user contact surface and a backing surface opposing the upper user contact surface, and wherein the connection portion further comprises:

a) an upper contact portion to engage a small portion of the upper user contact surface of the first pedal;

b) a lower contact portion to engage the backing surface of the first pedal;

c) securing means to provide for applying a binding pressure between the upper contact portion and the lower contact portion to bind the connection portion to the first pedal of the motor vehicle.

10. The hand operated control device defined in claim 6 wherein the extension portion further comprises an angular offset positioned between the user manipulation end and the distal end wherein the extension portion extends relative to the first pedal in a first directional orientation and then extends toward the user manipulation end in a second directional orientation.

11. The hand operated control device defined in claim 6 wherein the user contact portion of the extension portion has a spherical shape and dimples positioned thereon wherein the user contact portion resembles a golf ball.

12. The hand operated control device defined in claim 6 wherein the motor vehicle further comprises a golf cart.

13. A hand operated control device to provide for control of a first pedal mounted relative to a floor of a golf cart and a second pedal mounted relative to the floor of the golf cart, the golf cart having a seat positioned relative to the first pedal and the second pedal for an operator of the golf cart, the first pedal having an elevated neutral position and a depressed operating position, the second pedal having an elevated neutral position and a depressed operating position, the hand operated control device comprising:

a) a connection portion for attachment to the first pedal of the golf cart;

b) an extension portion having a user manipulation end and a distal end, the distal end positioned relative to the connection portion, the user manipulation end having a user contact portion, the user manipulation end to provide for:

1) operator control of the extension portion in a range of motion along an arc, the range of motion having a lower position and an upper position, and wherein the lower position of the range of motion provides for placement of the first pedal of the golf cart in the elevated neutral position and wherein the upper position of the range of motion provides for placement of the first pedal of the golf cart at least toward the depressed operating position from the elevated neutral position;

2) operator control of the user contact portion in a rotational range of motion, the rotational range of motion having a neutral position, and wherein the neutral position of the rotational range of motion provides for placement of the second pedal of the golf cart in the elevated neutral position and wherein rotation of the user contact portion from the neutral position provides for placement of the second pedal of the golf cart at least toward the depressed operating position from the elevated neutral position;

c) angular adjustment means to provide for selective placement of the extension portion relative to the connection portion at a desired angle of protrusion wherein the extension portion may be positioned at a desired orientation relative to the seat of the golf cart.

14. The hand operated control device defined in claim 13 wherein the user contact portion of the extension portion has a spherical shape and dimples positioned thereon wherein the user contact portion resembles a golf ball.

15. The hand operated control device defined in claim 13 wherein the extension portion further comprises an angular offset positioned between the user manipulation end and the distal end wherein the extension portion extends relative to the first pedal in a first directional orientation and then extends toward the user manipulation end in a second directional orientation.

16. The hand operated control device defined in claim 13 wherein the first pedal of the motor vehicle further comprises an upper user contact surface and a backing surface opposing the upper user contact surface, and wherein the connection portion further comprises:

a) an upper contact portion to engage a small portion of the upper user contact surface of the first pedal;

b) a lower contact portion to engage the backing surface of the first pedal;

c) securing means to provide for applying a binding pressure between the upper contact portion and the lower contact portion to bind the connection portion to the first pedal of the motor vehicle.

* * * * *